J. HERBING.
APPARATUS FOR EXTRACTING DUST FROM AIR OR VAPOR.
APPLICATION FILED OCT. 3, 1913.
1,130,596.
Patented Mar. 2, 1915.
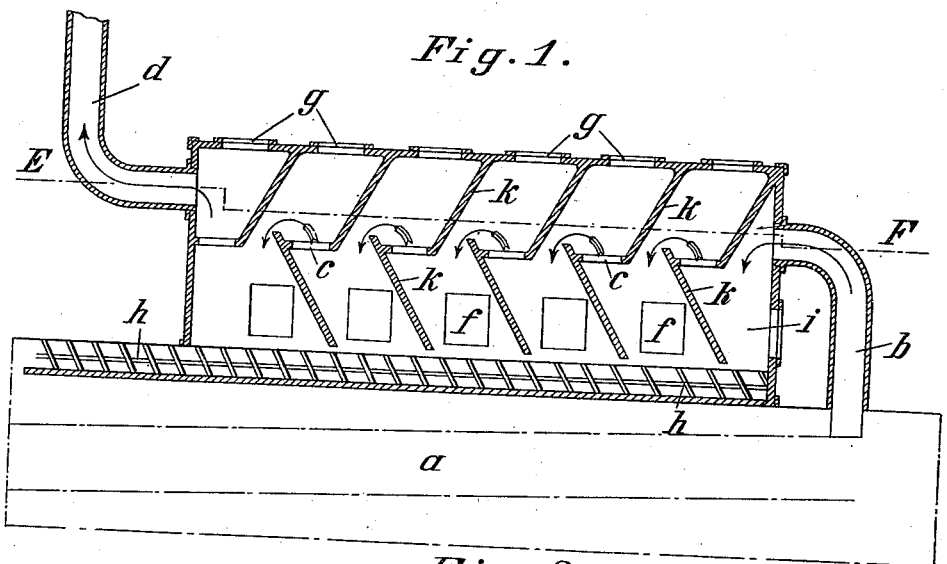
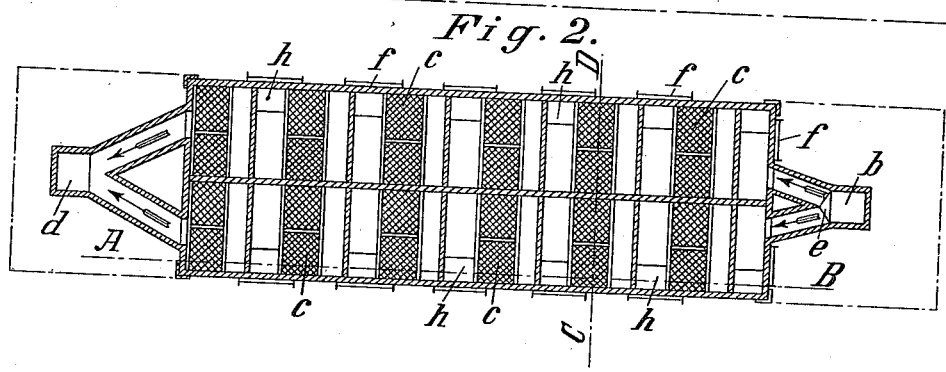
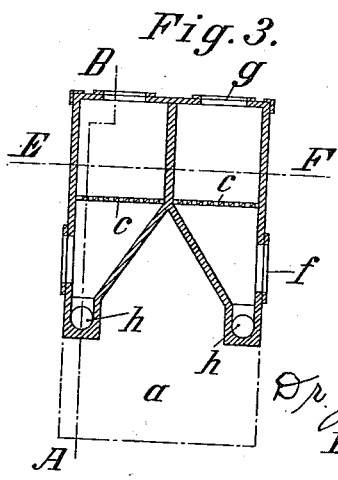
Witnesses:
Inventor:
Dr. Johannes Herbing
By Knight Bros
Attorneys

UNITED STATES PATENT OFFICE.

JOHANNES HERBING, OF HALLE-ON-THE-SAALE, GERMANY.

APPARATUS FOR EXTRACTING DUST FROM AIR OR VAPOR.

1,130,596.  Specification of Letters Patent.  Patented Mar. 2, 1915.

Application filed October 3, 1913. Serial No. 793,192.

*To all whom it may concern:*

Be it known that I, Dr. JOHANNES HERBING, a subject of the German Emperor, and residing at Marienstrasse 7, Halle-on-the-Saale, Germany, have invented certain new and useful Improvements in an Apparatus for Extracting Dust from Air or Vapor, of which the following is a specification.

The removal of dust from places in which the air or vapor is laden with dust is not only of great importance from a hygienic point of view but is also of extreme importance in connection with the recovery, in this way, of materials contained in the air or vapor. In the case of factory chimneys, the extraction of the smoke-particles not only benefits the industry but also, as it prevents claims for smoke damage, benefits those concerned.

The present invention relates to a suitable apparatus for freeing the air or the vapor of the dust or other particles contained therein.

In carrying out the process the dust laden air, is conveyed through a series of dust-cells, arranged within a chamber, and toward inclined partition walls built therein and also through filters of accrescent fineness so that first the largest dust-particles and finally the smallest particles are removed.

By way of example one mode of constructing the apparatus is shown on the drawings, whereon:—

Figure 1 represents a longitudinal section on line A—B of Fig. 3, Fig. 2 a horizontal section on line E—F of Figs. 1 and 3, and Fig. 3 a cross section on line C—D of Fig. 2, of a dust chamber provided with filters for a heater-appliance.

Above the furnace $a$ is an outlet pipe $b$ extending from the furnace to the chamber. The dust-laden air passes through this pipe into the chamber $i$, through the filters $c$ arranged between the partition walls $k$, to the discharge $d$. The delivery to the chamber can be regulated by means of dampers $e$. Manholes $f$ are provided for cleaning purposes and explosion doors $g$ are provided in the roof of the chamber for safety. Screw conveyers $h$ are also provided in order to remove the collected dust. The chamber can be constructed of any suitable material, (brickwork, concrete, iron, or the like). The chamber is, for insuring a continuous action preferably, divided by a longitudinal partition into two parts, so that in case of repair or cleaning of one part of the chamber, the removal of the dust can still be effected in the other part. Each part of the chamber is controlled by the damper $e$. Partition walls $k$ are built in the chamber, preferably, at an angle less than 60°, and said walls support the filters $c$ which latter are preferably constructed of hemp (although other material may be employed) and are interchangeably arranged. They are arranged in such manner that they increase in fineness from the air entrance to the outlet for the same. In this way, first, the largest particles and finally, the finest particles of dust are caught without any important decrease in draft, the dust collected by the filters falls (for the most part automatically by its own weight and partly owing to the inclined partition walls and the vibration) into a channel in which works a screw conveyer $h$ for carrying the dust to the collectors or for returning it to the apparatus for further treatment.

The chamber is, in every case, built to suit the special requirements and the characteristic features of the construction are indicated in the following claims.

What I claim is:—

1. In apparatus for removing dust from dust-laden gases or vapor, the combination of a chamber having an inlet and an outlet, partition walls dividing the chamber into a series of cells located between the inlet and the outlet, and a filter mounted in each partition, the filters being of gradually increasing fineness toward the outlet and each partition wall being inclined at an angle of less than sixty degrees to the vertical.

2. In apparatus for removing dust from dust-laden gases or vapor, the combination of a chamber having an inlet and an outlet, partition walls dividing the chamber into a series of cells located between the inlet and the outlet, and a filter mounted in each partition, the filter being of gradually increasing fineness toward the outlet; a channel at the bottom of the chamber below the partition walls, and means for conveying dust out of the channel.

In testimony whereof I affix my signature in presence of two witnesses.

DR. JOHANNES HERBING.

Witnesses:
WOLDEMAR HAUPT,
HENRY HASPER.

Copies of this patent may be obtained for five cents each, by addressing the "Commissioner of Patents, Washington, D. C."